United States Patent Office 2,716,626
Patented Aug. 30, 1955

2,716,626

THIOCYANO FATTY ACID ESTERS OF METHYL ALKYL KETONE CYANOHYDRINS AND INSECTICIDES CONTAINING THEM

Henry Martin, Zurich, Switzerland, assignor to Cilag Limited, Schaffhausen, Switzerland, a Swiss company No Drawing. Application December 30, 1952, Serial No. 328,813

Claims priority, application Switzerland January 11, 1952

3 Claims. (Cl. 167—22)

This invention relates to new thiocyano fatty acid esters of methyl alkyl ketone cyanohydrins, showing outstanding insecticidal properties. The quickness of the insecticidal action (knockdown effect) of such esters is especially to be mentioned. When applied in small concentrations only, various kinds of insects as flies, mosquitoes, gnats, malaria gnats, yellow fever gnats, bugs, ants, cockroaches, kitchen moths, etc. are paralyzed very quickly and perish after a short time. On certain insects, my new compounds have an additional repellent effect. Due to these properties, my thiocyano fatty acid esters of methyl alkyl ketone cyanohydrins are valuable from a commercial point of view. Up to now, both production and action have been unknown.

My thiocyano fatty acid esters are prepared by known methods. For instance, acetone cyanohydrin is reacted with halogen acetic acid halides in the presence of acid binding agents, and the acetone cyanohydrin halogeno acetic acid esters obtained are further reacted with a salt of thiocyanic acid, for instance, potassium or ammonium thiocyanate. Instead of halogeno acetic acid halides, other reactive halogeno acetic acid derivatives and the halogeno acetic acids themselves, respectively, may also be used.

Insecticides based on my compounds, as used on farms and in homes for pest control, may be produced by adding talcum, chalk, emulsification agents, copper salts, sulphur, pentachloro phenol, etc. These insecticides may be applied in form of powder, dusts, emulsions, sprays, etc.

Example 1

85 gms. of acetone cyanohydrin are dissolved in 170 ccs. of dried benzene and cooled to 0–5°. At this temperature and at the same time, 87 gms. of pyridine mixed with 174 ccs. of dried benzene and 124 gms. of chloroacetyl chloride mixed with 166 ccs. of dried benzene are added drop by drop within 1–1½ hours. After addition of about one-half of both of these components, the pyridine chlorohydrate starts precipitating, after the reaction has been completed, stirring is continued for another hour at the same temperature. Upon cooling, the reaction mass is filtered from the separated pyridine chlorohydrate and washed with dried benzene. The benzene solution is washed with water and sodium bicarbonate, dried with sodium sulfate, and the benzene is destilled off. Raw yield 159 gms.=98% of the theory, B. P. 0.5 mm. 64°. Yield 137 gms.=85% of the theory.

To 300 ccs. of dried acetone 84 gms. of ammonia thiocyanate and 161 gms. of acetone cyanohydrin chloro acetic acid ester are added. On heating, the whole dissolves, and under refluxing and stirring, the separating of ammonium chloride starts immediately. The reaction is practically finished after one hour. After cooling, the ammonium chloride is sucked off, and the filtrate is evaporated. The residue is taken up in benzene and thoroughly washed with water and bicarbonate, dried, and the benzene distilled off in vacuo. Yield 175 gms.=95% of the theory, B. P. 0.2 mm. 113°. The thiocyano acetic ester constitutes a yellow slightly viscous oil easily soluble in acetone, ether, cyclo hexanone, benzene, tolual and xylene. Instead of the chloro acetyl chloride, α- or β-halogeno propionic acid or α-halogeno butyric acid halide may also be used. Besides the cyanohydrin of acetone, other cyanohydrins may be used, for instance, the cyanohydrin of methyl ethyl ketone, acetoacetic acid ethyl ester, methyl butyl ketone, and cyanohydrins of other suitable ketones.

The following examples shall illustrate in which way the effective substances according to the invention may be used as bases for various repellents:

Example 2

By intensively mixing 10 parts of acetone cyanohydrin thiocyano acetic acid ester with 90 parts of talcum and 3 parts of oleine, a powder is obtained which may be used in homes against ants, moths, and bugs, or for the killing of lice and fleas of human beings and animals.

Example 3

By mixing 5 parts of acetone cyanohydrin thiocyano acetic acid ester with 3 parts of copper acetate, 7 parts of copper hydroxy chloride, 28 parts of sulphur, 2 parts of oleine, and 50 parts of talcum, a powdered substance is obtained which may be used for different purposes on farms.

Example 4

20 parts of acetone cyanohydrin thiocyano acetic acid ester, 25 parts of acetone, 30 parts of xylene, and 30 parts of a castor oil sulfonate are mixed which mixture, when added to water, forms an emulsion. Such emulsion may, for example, be used for the treatment of wool to render same mothproof.

Example 5

5 parts of acetone cyanohydrin thiocyano acetic acid ester are dissolved in 50 parts of xylene and mixed with 50 parts of a high boiling petroleum. A solution is obtained which may be used as spray against flies and gnats.

Example 6

5 parts of acetone cyanohydrin thiocyano acetic acid ester, and one part of lindane are made into an ointment which may be used for the treatment of scurf.

Example 7

5 parts of DDT, 2 parts of acetone cyanohydrin thiocyano acetic acid ester, and 93 parts of highly purified petroleum are dissolved under addition of xylene. The mixture may be used as a spray in homes.

What I claim is:
1. New thiocyano fatty acid esters of cyanohydrins of methyl alkyl ketones of the general formula

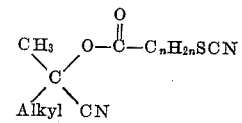

wherein Alkyl is a lower alkyl radical and $n$ is an integer from 1 to 5.

2. The new thiocyano acetic acid ester of the cyanohydrin of methyl ethyl ketone of the formula

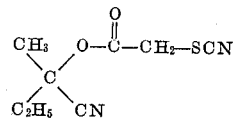

3. A composition having a strong insecticidal action containing as an active ingredient at least a compound of the formula

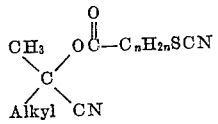

wherein Alkyl represents a lower alkyl radical and $n$ is an integer from 1 to 5 admixed with a carrier selected from the class consisting of a solid, a pasty and a liquid carrier.

References Cited in the file of this patent
UNITED STATES PATENTS

| | | |
|---|---|---|
| 1,559,961 | Seil et al. | Nov. 3, 1925 |
| 2,123,186 | Epstein et al. | July 12, 1938 |
| 2,220,521 | Hester | Nov. 5, 1940 |

FOREIGN PATENTS

| | | |
|---|---|---|
| 432,188 | Great Britain | July 23, 1935 |

OTHER REFERENCES

Murphy et al.: Jour. of Economic Entomology, February 1932 (pp. 123 and 125).